United States Patent [19]
Brilando et al.

[11] 3,807,761
[45] Apr. 30, 1974

[54] SAFETY MOUNTING FOR QUICK-RELEASE HUBS

[75] Inventors: Frank P. Brilando, Niles; Stanley R. Jameson, Chicago, both of Ill.

[73] Assignee: Schwinn Bicycle Company, Chicago, Ill.

[22] Filed: Dec. 26, 1972

[21] Appl. No.: 318,498

[52] U.S. Cl. .............................................. 280/279
[51] Int. Cl. .............................................. B62k 25/02
[58] Field of Search ........... 280/279, 289, 288, 287, 280/278; 301/1

[56] References Cited
UNITED STATES PATENTS
3,507,516  4/1970  Fritz .................................... 280/279
1,387,215  8/1921  Wagner ............................... 280/279

FOREIGN PATENTS OR APPLICATIONS
975,528  10/1950  France ................................. 280/288
1,255,141  1/1961  France ..................................... 301/1
709,562  7/1941  Germany ............................ 280/278
939,674  2/1956  Germany ............................ 280/288

Primary Examiner—M. Henson Wood, Jr.
Assistant Examiner—Reinhard J. Eisenzopf
Attorney, Agent, or Firm—Davis, McCaleb & Lucas

[57] ABSTRACT

Slots in lower ends of front fork legs receive front wheel axle of bicycle in usual manner, but to prevent accidental displacement of axle and wheel from fork slots even if regular retaining means on axle become loose, safety means are provided comprising retaining clip pivotally mounted on each fork leg for selective movement from inoperative to operative position to close slot and prevent removal of axle therefrom, retaining clips being frictionally maintained in any selected position.

3 Claims, 4 Drawing Figures

PATENTED APR 30 1974
3,807,761
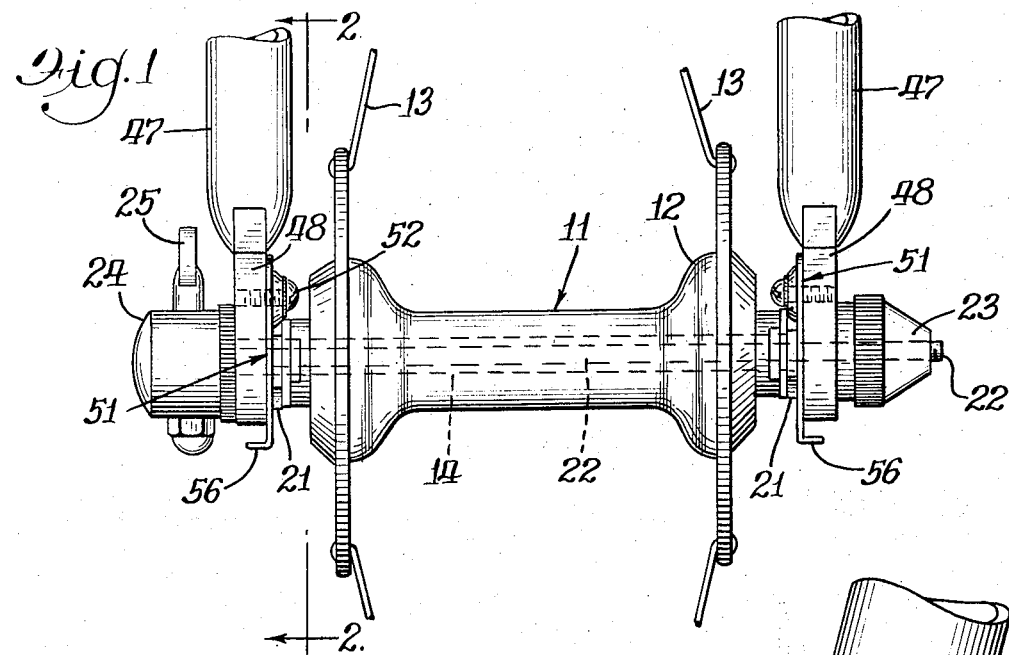
Fig.1
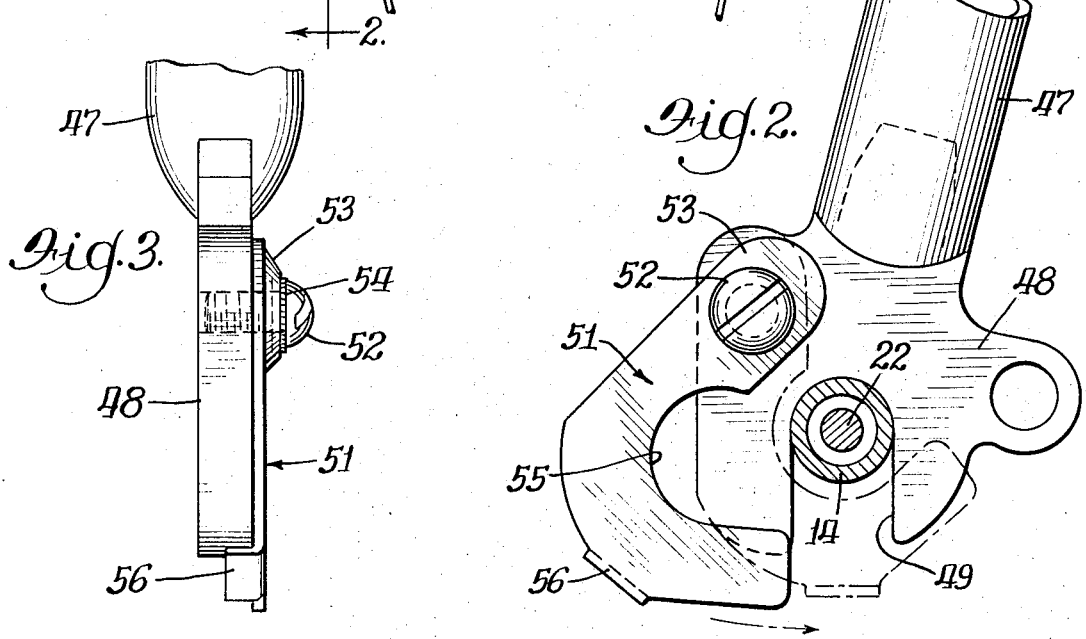
Fig.3
Fig.2
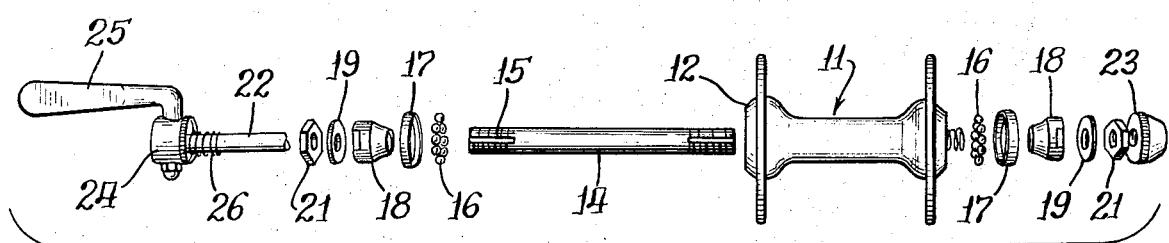
Fig.4

SAFETY MOUNTING FOR QUICK-RELEASE HUBS

BACKGROUND OF THE INVENTION

1. Field of the Invention

This invention relates generally to bicycles, and more particularly to the mounting of front wheel quick-release hubs.

2. Description of the Prior Art

It is customary to mount the front wheel, hub and axle assembly in slots in the lower ends of the legs of the front fork of a bicycle which are open at their lower ends to receive the outer ends of the axle, with the axle being held in the upper ends of those slots by retaining nuts threadedly mounted on the outer ends of the axle and lock washers, or the like. Means have been provided to prevent separation or downward movement of the axle from such slots if the retaining nuts accidentally loosen, as disclosed in U. S. Pat. No. 3,507,516 wherein the upper end of each axle-receiving slot has a circular enlargement to receive a laterally extending annular flange on a washer slidable on the axle longitudinally thereof. Thus, after the axle has been slid up into those slots, the flanged washers are slid along the axle to engage their annular flanges in the circular enlargements of the slots. Since the annular flanges of the washers have an outer diameter greater than the width of the slots, they will prevent downward movement of the axle relative to the fork. Such flanged washers cannot be employed as safety mounting means with quick-release hubs, however, because they must be movable longitudinally on the axle into and out of engagement with the enlargements at the upper ends of the fork leg slots, and the quick-release unit employed in quick-release hubs would prevent such flanged washer movements.

SUMMARY OF THE INVENTION

This invention provides a safety mounting for quick-release hubs which eliminates accidental separation thereof from the fork leg slots, even though the quick-release unit becomes loose or is moved to release condition. More specifically, this safety mounting comprises clip means mounted on the fork legs for selective manual movements relative thereto between inoperative position and operative position blocking removal of the axle from the leg slots, together with retaining means automatically operable to maintain the clip means in selected position.

In the drawings:

FIG. 1 a front elevational view of a quick-release hub mounted in the lower ends of the legs of a bicycle front fork;

FIG. 2 is an enlarged vertical section taken substantially on the line 2—2 of FIG. 1;

FIG. 3 is a detail front elevation as seen from the left side of FIG. 2; and

FIG. 4 is an exploded view of a quick-release hub and quick-release mounting stud unit.

DESCRIPTION OF THE PREFERRED EMBODIMENT

As noted, this invention provides safety mounting for quick-release hubs. An example of the latter is illustrated in FIGS. 1 and 4 and designated generally by reference numeral 11. This quick-release hub 11 includes a shell with end cups 12 and supporting and having attached thereto the usual wheel spokes 13, and a hollow axle 14, best seen in FIG. 4 as having outwardly threaded end portions, each with an axially extending keyway 15. The end cups 12 are rotatably supported on the axle 14 by bearings adjacent each end of the latter and each comprising ball bearings 16, a dust cap 17, a bearing cone 18 screwed onto the axle, a lock washer 19 and a locking nut 21.

The quick-release hub 11 also includes a quick-release unit in the form of a mounting stud or rod 22 extending axially through the hollow axle 14 and having adjustable retainer members on its ends comprising a nut 23 (FIG. 1) and an eccentric 24 movable relative to the stud 22 longitudinally thereof by a manually operable lever 25. The mechanism so far described comprises a well known quick-release hub for a bicycle, and the reference numerals are the same as those employed to designate like parts in copending application for U. S. Letters Patent Ser. No. 304,070, filed Nov. 6, 1962.

As best seen in FIGS. 1–3, the lower portions of a pair of legs 47 of the front fork of a bicycle are illustrated, each having a front fork end piece 48 mounted therein and depending therefrom in well known manner. As will be understood by one skilled in the art, these legs may be forged or tubular (as shown herein) and the end pieces 48 are each provided with the usual axle-receiving open-end slot 49 (FIG. 2). The axle 14 of the quick-release hub 11 is illustrated as being seated in the upper ends of these slots 49 with the fork end pieces 48 disposed between the lock nuts 21 and their associated adjustable retainer members 23, 24. As also is well known, following upward movement of the wheel and the hub 11 to so engage the axle 14 in the slots 49 of the leg end pieces 48, rotation of the manually operable lever 25 from its release position of FIG. 4 to its inner position of FIG. 1 will draw the two retaining members 23, 24 together or toward each other to clampingly engage against the outer surfaces of the respective end pieces 48.

The present invention provides axle retaining clip means comprising a clip member 51 pivoted, as by means of a screw 52, adjacent its upper end and secured thereby to each of the fork end pieces 48. The upper end of each clip member 51 is provided with a laterally offset portion 53 apertured to receive the screw 52, and a suitable lock washer 54 is interposed between the head of the screw and this offset portion 53. With such arrangement, tightening of the screw 52 not only will secure the clip member 51 to its end piece 48, but also is employed to maintain the clip member in frictional contact with the associated leg or its end piece to retain the clip in any selected position to which it may be pivotally moved. Adjacent its other end, each clip member 51 is formed with a recess 55 defining a slot-closing portion, and a laterally extending tab or finger piece 56 to facilitate selective pivotal movement of the clip member.

In FIG. 2, a clip member 51 is shown in full lines in its inoperative position and in broken lines, as swung counterclockwise therefrom about the screw 52 as a pivot, in its operative position in which the slot-closing portion defined by the recess 55 is disposed below the axle 14 to prevent downward movement thereof out of the slot 49. Consequently, even though the manually operable lever 25 of the quick-release hub inadvertently is moved to release position or if for any other reason the retainer members 23, 24 are loosened from their normal engagement of the fork end pieces 48, clip members 51 in their operative broken line positions of FIG. 2 will prevent separation of the wheel and its hub 11 from the legs of the front fork. However, whenever it is desired intentionally to remove the wheel from the fork, in addition to swinging the lever 25 to release position, it is necessary only to swing the retaining clip members 51 to their full line inoperative positions of FIG. 2.

While clip members 51 are mounted in the illustrated embodiment on the inner surfaces of the fork end pieces 48, it will be appreciated that they may be mounted, if desired, on the outer vertical surfaces of those fork end pieces. In either case, each laterally extending finger piece 56 preferably will be aligned with the fork end piece 48 on which it is mounted so as to be disposed below the same when the clip member is in its operative position.

It is thought that the invention and many of its attendant advantages will be understood from the foregoing description, and it will be apparent that various changes may be made in the form, construction, and arrangement of the parts without departing from the spirit of the invention or sacrificing all of its material advantages, the form hereinbefore described and shown in the drawings being merely a preferred embodiment thereof.

We claim:

1. A safety mounting for a quick-release hub having an axle engageable in open-ended slots in the lower ends of the legs of the front fork of a bicycle for receiving said axle, comprising the combination of a quick-release unit including adjustable retainer members movable relative to said axle longitudinally thereof, clip means mounted on said legs for selective manual movements relative thereto between inoperative position and operative position blocking removal of said axle from said slots, and retaining means automatically operable to maintain said clip means in selected position.

2. A safety mounting according to claim 1, wherein said clip means comprises a clip member pivotally mounted at one end on each said leg and formed adjacent its other end with a slot-closing portion.

3. A safety mounting according to claim 2, wherein said retaining means comprises a laterally offset portion of each said clip member and pivot means for each said clip member engaging the associated said offset portion to maintain said clip member in frictional contact with the associated said leg.

* * * * *